United States Patent
Reznik et al.

(10) Patent No.: US 8,433,894 B2
(45) Date of Patent: Apr. 30, 2013

(54) SUPPORT OF PHYSICAL LAYER SECURITY IN WIRELESS LOCAL AREA NETWORKS

(75) Inventors: Alexander Reznik, Titusville, NJ (US);
Joseph S. Levy, Merrick, NY (US);
Yogendra C. Shah, Exton, PA (US);
Suhas Mathur, Edison, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 429 days.

(21) Appl. No.: 12/499,530

(22) Filed: Jul. 8, 2009

(65) Prior Publication Data

US 2010/0131751 A1    May 27, 2010

Related U.S. Application Data

(60) Provisional application No. 61/078,868, filed on Jul. 8, 2008, provisional application No. 61/112,419, filed on Nov. 7, 2008.

(51) Int. Cl.
*H04L 29/06* (2006.01)

(52) U.S. Cl.
USPC .......................................... 713/151; 370/252

(58) Field of Classification Search .......... 713/150–151; 370/252
See application file for complete search history.

(56) References Cited

U.S. PATENT DOCUMENTS

| | | | |
|---|---|---|---|
| 2002/0010735 A1* | 1/2002 | McMillen et al. | 709/201 |
| 2003/0112786 A1* | 6/2003 | Terry et al. | 370/342 |
| 2004/0071164 A1* | 4/2004 | Baum | 370/469 |
| 2004/0165539 A1* | 8/2004 | Huckins | 370/252 |
| 2005/0037733 A1 | 2/2005 | Coleman et al. | |
| 2005/0108401 A1* | 5/2005 | Gonda | 709/227 |
| 2005/0144646 A1* | 6/2005 | Lecrom et al. | 725/100 |
| 2008/0069058 A1* | 3/2008 | Geng et al. | 370/336 |
| 2008/0137553 A1* | 6/2008 | Hsu et al. | 370/254 |
| 2008/0186135 A1* | 8/2008 | Boling et al. | 340/7.51 |
| 2008/0259957 A1* | 10/2008 | Kliger et al. | 370/469 |

FOREIGN PATENT DOCUMENTS

| | | |
|---|---|---|
| EP | 1 858 221 | 11/2007 |
| WO | 96/23376 | 8/1996 |
| WO | 03/088532 | 10/2003 |

(Continued)

OTHER PUBLICATIONS

Li et al., "Securing Wireless Systems via Lower Layer Enforcements," Proceedings of the $5^{th}$ ACM Workshop on Wireless Security, pp. 33-42 (Sep. 2006).

(Continued)

*Primary Examiner* — Hadi Armouche
(74) *Attorney, Agent, or Firm* — Woodcock Washburn LLP

(57) ABSTRACT

A method and an apparatus for performing physical layer security operation are disclosed. A physical layer performs measurements continuously, and reports the measurements to a medium access control (MAC) layer. The MAC layer processes the measurements, and sends a security alert to a security manager upon detection of an abnormal condition based on the measurements. The security manager implements a counter-measure upon receipt of the security alert. The measurements include channel impulse response (CIR), physical medium power measurement, automatic gain control (AGC) value and status, automatic frequency control (AFC) gain and status, analog-to-digital converter (ADC) gain, Doppler spread estimate, and/or short preamble matched filter output. The security manager may switch a channel, switch a channel hopping policy, change a back-off protocol, or change a beamforming vector upon reception of the security alert.

24 Claims, 4 Drawing Sheets

FOREIGN PATENT DOCUMENTS

| | | |
|---|---|---|
| WO | 2006/081122 | 8/2006 |
| WO | 2006/081306 | 8/2006 |
| WO | 2007/124054 | 11/2007 |
| WO | 2008/010838 | 1/2008 |
| WO | 2009/140228 | 11/2009 |

OTHER PUBLICATIONS

Patwari et al., "Robust Location Distinction using Temporal Link Signatures," Proceedings of the 13th Annual ACM International Conference on Mobile Computing and Networking, pp. 111-122 (Sep. 2007).

Xiao et al., "A Physical-Layer Technique to Enhance Authentication for Mobile Terminals," IEEE International Conference on Communications, pp. 1-5 (2008).

Azimi-Sadjadi et al., "Robust Key Generation from Signal Envelopes in Wireless Networks," Proceedings of the 14th ACM Conference on Computer and Communications Security, pp. 401-410 (Oct. 2007).

Ahlswede et al., "Common Randomness in Information Theory and Cryptography—Part I: Secret Sharing," IEEE Transactions on Information Theory, vol. 39, No. 4, pp. 1121-1132 (Jul. 1993).

Aono et al., "Wireless Secret Key Generation Exploiting Reactance-Domain Scalar Response of Multipath Fading Channels," IEEE Transactions on Antennas and Propagation, vol. 53, No. 11, pp. 3776-3784. (Nov. 2005).

Brassard et al., "Secret-Key Reconciliation by Public Discussion," Advances in Cryptology Procedures, Lecture Notes in Computer Science, vol. 765, pp. 410-423 (1994).

Cardinal et al., "Construction of a Shared Secret Key Using Continuous Variables (Full Text Report)," Information Theory Workshop (2003).

Wilson et al., "Channel Identification: Secret Sharing Using Reciprocity in Ultrawideband Channels," IEEE Transactions on Information Forensics and Security, vol. 2, No. 3 (Sep. 2007).

Hassan et al., "Cryptographic Key Agreement for Mobile Radio," Digital Signal Processing, vol. 6, pp. 207-212 (1996).

Koorapaty et al., "Secure Information Transmission for Mobile Radio," IEEE Communication Letters, vol. 4, No. 2 (Feb. 2000).

Mathur et al., "Radio-telepathy: Extracting a Secret Key from an Unauthenticated Wireless Channel," The 14th Annual International Conference on Mobile Computing and Networking (2008).

Maurer, "Secret Key Agreement by Public Discussion from Common Information," IEEE Transactions on Infomration Theory, vol. 39, pp. 733-742 (1993).

Maurer et al., "Secret-Key Agreement over Unauthenticated Pubilc Channels—Part II: The Simulatability Condition," IEEE Transactions on Information Theory, vol. 49, No. 4, pp. 832-838 (Apr. 2003).

Menezes et al., Handbook of Applied Cryptography, CRC Press, p. 172 (1996).

Krasny et al., "Doppler spread estimation in mobile radio systems," IEEE Communications Letters, vol. 5, Issue 5, pp. 197-199 (May 2001).

Ye et al., "Extracting Secrecy from Jointly Gaussian Random Variables," Proceedings of IEEE International Symposium on Information Theory, pp. 2593-2597 (Jul. 2006).

Xiao et al., "Fingerprints in the Ether: Using the Physical Layer for Wireless Authentication," Proceedings of the IEEE International Conference on Communications, pp. 4646-4651 (2009).

Bennett et al., "Privacy Amplification by Public Discussion," SIAM Journal of Computers, vol. 17, No. 2, pp. 210-229 (1988).

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications," IEEE Computer Society, 802.11-2007 (Jun. 2007).

"IEEE Standard for Local and metropolitan area networks, Media Access Control (MAC) Security," IEEE Computer Society, IEEE Std. 802.AE-2006 (Aug. 2006).

"IEEE Standard for Local and metropolitan area networks, Port-Based Network Access Control," IEEE Computer Society, IEEE Std. 802.1X-2004 (Dec. 2004).

IEEE Standard for Information technology—Telecommunications and information exchange between systems—Local and metropolitan area networks—Specific requirements, Part 11: Wireless Medium Access Control (MAC) and Physical Layer (PHY) specifications: Amendment 6: Medium Access Control (MAC) Security Enhancements, IEEE P802.11i/D10.0 (Apr. 2004).

\* cited by examiner

SUPPORT OF PHYSICAL LAYER SECURITY IN WIRELESS LOCAL AREA NETWORKS

CROSS REFERENCE TO RELATED APPLICATIONS

This application claims the benefit of U.S. provisional application Nos. 61/078,868 filed Jul. 8, 2008 and 61/112,419 filed Nov. 7, 2008, which are incorporated by reference as if fully set forth.

FIELD OF INVENTION

This application is related to wireless communications.

BACKGROUND

Wireless networks, and in particular networks based on the IEEE 802.11 standards, have experienced explosive growth in the last decade. Examples of WLAN usage include Internet protocol (IP) access to a broadband network, streaming applications over IP, (e.g., voice over IP (VoIP), video, etc.), interactive local applications (distributed gaming), localized mesh network with limited or no extra-network access, and machine-to-machine communication such as home and small enterprise automation, sensor network to data network interaction, or distributed computation.

Today, a significant number of organizations rely on wireless networks for their operations. But the wireless communication medium is different from wired communication medium. While the design of wireless local area networks (WLANs), in particular 802.11 WLANs, has done an excellent job at addressing the challenges and opportunities associated with wireless, the same cannot be said for security and robustness of these networks.

The current WLAN security is essentially based on the security of wired networks, which is insufficient and inappropriate for the wireless medium. The most important reason for this is the fact that the wireless medium is intrinsically a broadcast medium. In order for an adversary to overhear communications in the wired network, a physical connection to the wire is required. This means that the first line of defense from eavesdropping in wired networks is physically preventing access to the networks, (e.g., ensuring that adversaries cannot enter a building or that they cannot tap a wire). In contrast, for wireless networks, adversaries can easily witness anything that is transmitted as long as they are within radio range of the transmitter.

Further complicating matters for wireless systems is the ubiquity and portability of the platform itself. The broadcast nature of the wireless medium implies that users are not tethered and that they may access network services from anywhere at anytime, and does not require an access to the wireless network from within a company's building.

In spite of the unique challenges that the wireless domain presents, the approach that is commonly taken to secure wireless networks has been to translate traditional cryptographic network security protocols to the wireless domain. Although the application of conventional cryptographic protocols to wireless networks is essential, such an approach is also incomplete as it completely leaves out the wireless aspect of the problem.

As an example, consider a rather simple selective blocking attack with the goal of severely reducing network throughput. Such an attack is remarkably simple to accomplish in modern wireless networks. To attack an 802.11 network, for example, it is sufficient to modify the carrier sense multiple access/collision avoidance (CSMA/CA) protocol to break the standard-defined rules and create interference specifically when it detects activity in the carrier. Since an 802.11 medium access control (MAC) only sees error corrected packets, it cannot tell the difference between such an attack and a poor channel condition or congestion that results in a packet loss. The MAC layer will therefore back-off subsequent transmission, further lowering its throughput, (i.e., it will do exactly what the attacker wants it to do).

Physical layer security is a scheme of using information obtained at the physical layer for implementing security-related functions. The physical layer security cannot be enabled in the conventional wireless systems, such as 802.xx WLANs, because the measurements required for physical layer security are not made or the measurements are made at the physical layer but not reported to the MAC layer or higher layers, required messaging support does not exist, required flexibility of operation does not exist, or required flexibility of operation exists but is not reported, and the like.

Therefore, it would be desirable to provide a WLAN system and method that enables the support various physical layer security techniques.

SUMMARY

A method and an apparatus for performing physical layer security operation are disclosed. A physical layer performs measurements continuously, and reports the measurements to a MAC layer. The MAC layer processes the measurements, and sends a security alert to a security manager upon detection of an abnormal condition based on the measurements. The security manager implements a counter-measure upon receipt of the security alert. The measurements include channel impulse response (CIR), physical medium power measurement, automatic gain control (AGC) value and status, automatic frequency control (AFC) gain and status, analog-to-digital converter (ADC) gain, Doppler spread estimate, and/or short preamble matched filter output.

The MAC layer may check consistency of a source MAC address-CIR pair and detect the abnormal condition if the source MAC address-CIR pair is not consistent. The MAC layer may detect a low-power jammer attack if unlikely collisions occur repeatedly. The security manager may switch a channel, switch a channel hopping policy, change a back-off protocol, or change a beamforming vector upon reception of the security alert.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the term "wireless transmit/receive unit (WTRU)" includes, but is not limited to, a user equipment (UE), a mobile terminal (MT), a station (STA), a fixed or mobile subscriber unit, a pager, a cellular telephone, a personal digital assistant (PDA), a computer, or any other type of user device capable of operating in a wireless environment. When referred to hereafter, the term "access point (AP)" includes, but is not limited to, a Node B, a site controller, a base station, or any other type of interfacing device capable of operating in a wireless environment.

Figure 1:
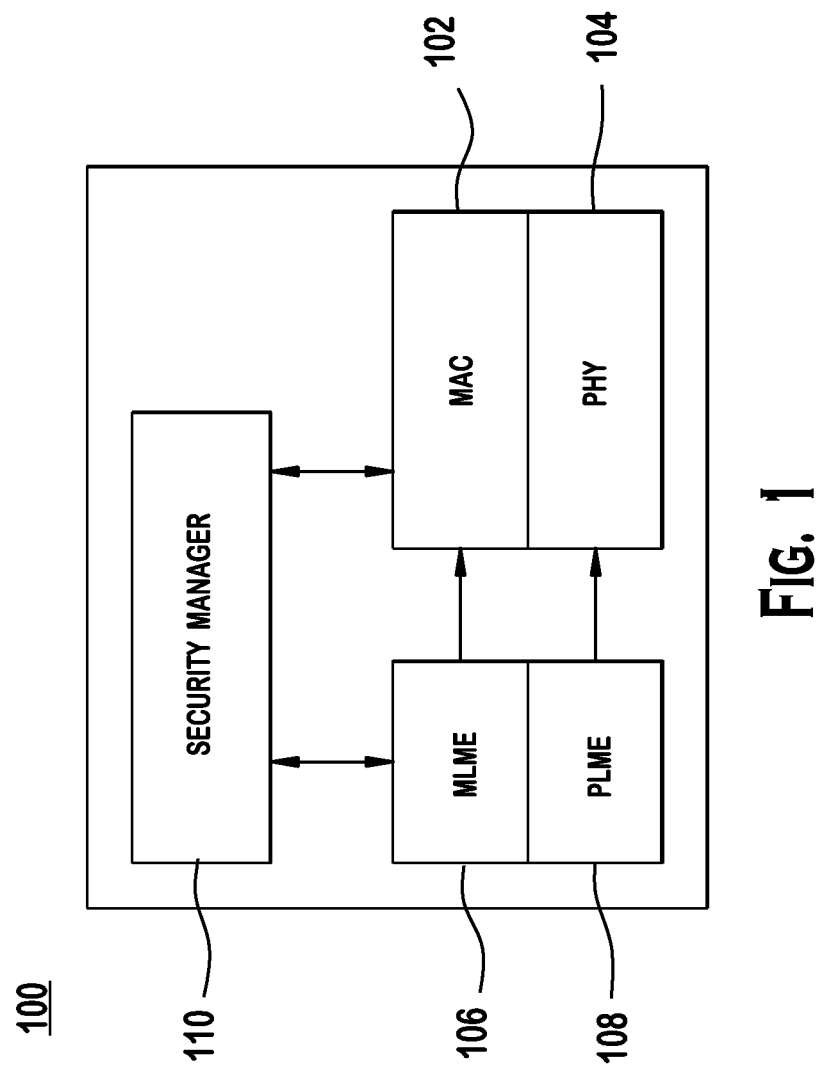
FIG. 1 is a block diagram of an example apparatus configured to perform physical layer security in accordance with one embodiment.

FIG. 1 is a block diagram of an example apparatus 100 configured to perform physical layer security in accordance with one embodiment. The apparatus 100 is configured to exploit the physical properties of a wireless channel in secure operations. The apparatus 100 exploits the physical link as a non-repudiatable shared secret resource to provide always-on, link-specific message stream authentication, to classify interference appropriately (malicious/benign) and apply appropriate counter-measures, to distinguish between co-located and distinctly located terminals, and to derive and update secret keys based on link properties without the need to use and expose authentication credentials. The apparatus 100 may further use link and terminal capabilities to null out an identified rogue terminal, switch away from channels under attack, and proactively hop channels to confuse an attacker. The apparatus 100 may be either a WTRU or an AP.

The apparatus 100 includes a MAC layer 102, a PHY layer 104, a MAC layer management entity (MLME) 106, a physical layer management entity (PLME) 108, and a security manager 110. The physical layer 104 performs measurements and reports the measurements to the MAC layer 104. The MAC layer 104 may send a security alert to the security manager 110 based on the measurements, which will be explained in detail below. The reporting may be periodic, polled, or event triggered, and may be specified for each measurement.

The security manager 110 implements a set of security policies to enable secure operation. The security manager 110 receives an alert of an abnormal condition, (i.e., potential attack), the nature of the condition, and/or an approximate localization of the condition, or the like from the MAC layer 102 or the physical layer 104, and implements a counter-measure against the abnormal condition. For example, the security manager 110 may request a change of a security policy to the MAC layer 102 or the physical layer 104 via the MLME 106 or the PLME 108. The security manager 110 may integrate higher-layer security policies and requirements with transmission medium capabilities. For example, a security manager may be aware of the differing communication requirements of various applications. Upon receiving a security alert, the security manager's response may be dependent on the application's security needs. For example, if an alert indicates the possibility of a receiver spoofing attack, some applications may require that no data is sent until the security issue is addressed while other applications may not care. In other words, the actions of security manager are dependent on a set of variables: the security alerts it receives; the needs of higher layer activities, and security policies available for mitigation, and the like. At all levels, services provided by secure platforms, such as a trusted platform module (TPM), may be used.

Alternatively, the MAC layer may process the measurements received from the physical layer and produce a security-related quantity, and the security manager may use the security-related quantity for security operation or provide the security-related quantity to another entity. The MAC layer may communicate with a MAC entity of at least one other entity. The measurements include, but are not limited to, at least one of channel impulse response, physical medium power measurement, automatic gain control (AGC) value and status, automatic frequency control (AFC) gain and status, analog-to-digital converter (ADC) gain, Doppler spread estimate, and short preamble matched filter output. The security-related quantity may be a source signature, a pairwise security key, or the like.

Figure 2:
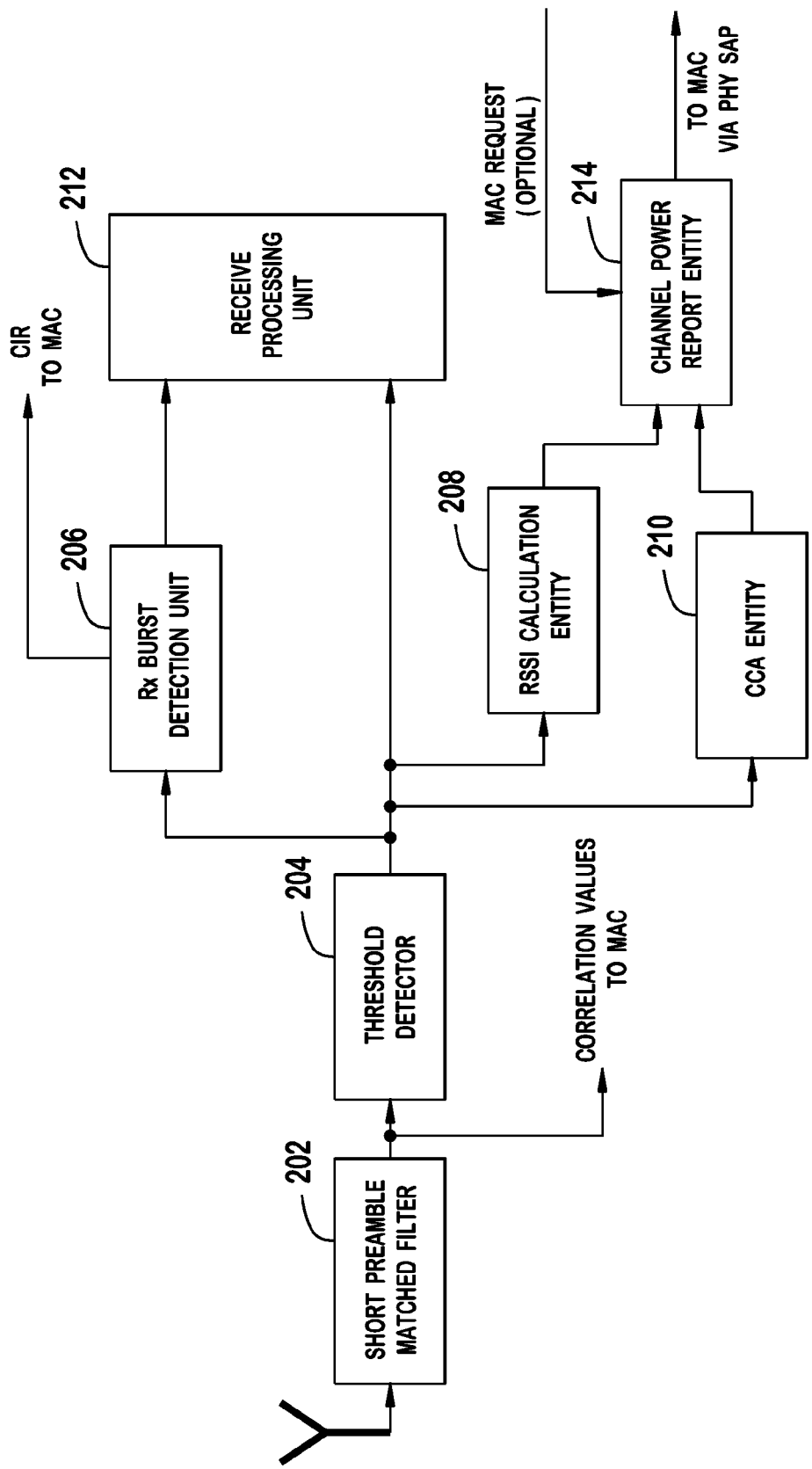
FIG. 2 shows a more detailed structure of the apparatus.

FIG. 2 shows a detailed structure of the receiver and the physical layer of the apparatus 100. The apparatus 100 includes a short preamble matched filter 202, a threshold detector 204, a receive burst detection unit 206, an RSSI calculation entity 208, a clear channel assessment (CCA) entity 210, a receive processing unit 212, and a channel power report entity 214. The matched filter 202 continuously performs correlation of the received signal via an antenna with the short preamble in order to detect the start of an incoming packet. The threshold detector 204 compares the correlation output from the matched filter 202 with a predetermined threshold. If the correlation output is higher than the threshold, the threshold detector 204 outputs a signal to other components to indicate the presence of the incoming signal. The receive burst detection unit 206 detects a burst and turns on the receive processing unit 212. The receive burst detection unit 206 also performs channel estimation to compute channel impulse response (CIR) based on, for example, a long preamble of the received burst. The RSSI calculation entity 208 computes an RSSI continuously and sends the RSSI to the channel power report unit 214. The RSSI is an example of the total received power measurement and any other quantity representing the total received power may be measured instead of the RSSI. The CCA entity 210 determines the current state of use of a wireless medium and sends a busy/not-busy signal to the channel power report entity 214.

Conventionally, the RSSI report is triggered by detection of the receive burst by the receive burst detection unit 206, and the CCA report is triggered by the request from the MAC layer. In accordance with one embodiment, physical medium power measurements, (such as RSSI and CCA), are performed continuously, instead of triggered by a certain event or a request from the MAC layer. The RSSI calculation entity 208 and the CCA entity 210 do not communicate directly with the MAC layer. Instead, the RSSI calculation entity 208 and the CCA entity 210 continuously report the RSSI and the busy/not-busy signal, respectively, to the channel power report entity 214.

The channel power report entity 214 receives the RSSI and a CCA signal continuously and sends a report to the MAC layer (more particularly, to a channel power monitor in the MAC layer) via a physical layer service access point (SAP). Optionally, the channel power report entity 214 may be configured to receive a request from the MAC layer and send the report to the MAC layer in response to the request.

The RSSI or any other total received power measurement (hereinafter "RSSI" for simplicity) may be made at the rate of the analog-to-digital conversion, (e.g., at 20 MHz for 802.11 systems). The RSSI may be reported at a predefined rate, as specified by the MAC layer or higher layers. The RSSI measurement may be sub-sampled and a sub-sampled stream of data may be provided to the MAC layer. Alternatively, the RSSI may be reported each time a packet is received or at a pre-defined rate during the reception of a packet. Alternatively, the RSSI may be reported only when it is above a certain threshold. Alternatively, different frequencies for reporting the RSSI may be defined in advance for different power levels. Additionally, a time stamp may be added to the RSSI. The MAC layer may detect a low-power jammer attack based on the RSSI measurement and the CCA report, which will be explained in detail below.

Additionally, the physical layer needs to report a CIR to the MAC layer. A CIR is a time or frequency-based estimate of the channel for a received burst. The CIR may be estimated from pilot symbols in direct sequence spread spectrum (DSSS) or a long preamble in orthogonal frequency division multiplex (OFDM). The measurement may be event-triggered by the reception of a burst.

The CIR measurement may be time-stamped in such a way that the corresponding burst is uniquely identified by the time stamp. The CIR may be associated with a source MAC address. The association with the source MAC address may be done during reporting by the physical layer. Alternatively, the optional time stamp may be used to associate the CIR with the source MAC address in the MAC layer. The reported CIR may be stored in a channel signature database and may be checked for the channel signature-MAC address matching for detecting, for example, a Sybil attack, which will be explained in detail below.

The physical layer may also report status and gain values of automatic gain control (AGC), automatic frequency control (AFC), and/or analog-to-digital converter (ADC). Conventionally, the time-varying values of the AGC are not reported to the higher layers. However, the AGC gain value or the status of the AGC, (i.e., whether the AGC is currently locked or not), may be used to enable accurate sample-level measurements for physical layer security. The AFC and ADC gain are also correction variables tracked by the receiver but currently they are not reported to higher layers or made available to a software interface. The AFC and ADC gain and status, (e.g., whether the AFC is applied or not), would enhance a physical layer security by enabling cleaner processing of other measurements, such as CIR and channel power, and better refined statistical anomaly tests.

The AGC, AFC and ADC correction values and status information may be reported at the A/D rate. Alternatively, the correction values and status information may be reported each time a packet is received. Alternatively, the correction values and status information may be reported each time the value changes by a pre-configured amount that may be pre-configured as a MAC parameter. Alternatively, the correction values and status information may be reported at a pre-specified rate configured as a MAC parameter.

The physical layer may also report Doppler spread estimate to the MAC layer. The Doppler spread in the received signal can give an indication of the relative velocity between the transmitter and the receiver and can allow the receiver to estimate the coherence time of the channel. Doppler spread estimation may be performed using a received pilot tone or a preamble sequence. The physical layer may report the Doppler spread estimate upon receiving a burst. The Doppler spread measurement may be associated with a time stamp of the received burst, as well as a source MAC address.

Doppler spread estimate is an important parameter in physical layer security as it indicates the time interval over which the channel should not substantially change. Thus, for example, for the prior work on key generation from fading channels, the Doppler spread would provide both a time duration over which a channel can be processed (averaged) to increase the post-processed SNR and derive higher secret bit rates and also when the channel has "renewed" itself so that a new set of bits can be generated. For example, in the CIR-based authentication, the authentication algorithm needs to take into account that the channel is likely to change completely at a rate about equal to the Doppler spread.

Conventionally, the matched filter output is not reported to higher layers or made available to a software interface. In accordance with one embodiment, the physical layer reports the matched filter output to the MAC layer. The correlation output may be used in determining the presence of malicious interference or for distinguishing legitimately received packets from interference packets sent by a malicious adversary. The correlation output is quantized in both time and amplitude.

The AP must maintain a sufficiently long history of back-off intervals (MAC layer back-offs caused by channel-busy assessments at WTRUs) observed by each WTRU associated with the AP, as well as a history of network allocation vector (NAV) timers and durations requested by each WTRU. While this information is readily available at the AP, it is not currently necessarily retained.

In accordance with one embodiment, the history of back-off intervals and NAV timers and durations are retained in a database and used for detecting MAC layer misbehavior in a given basic service set (BSS). For example, users who are not adhering to the MAC protocol may be identified with the history of back-off intervals and/or NAV timers. When a user does not behave as it should: double the size of the contention window as they should each time there is a channel busy assessment, or not choosing a random back-off interval within the contention window, it could be a sign of malicious attack and the AP or any other entity may implement countermeasures. Maintaining a history of NAV values requested by WTRUs may, for example, aid in the detection of a power-constrained jammer who simply attempts to request air time from the AP for the purpose of reducing channel availability to legitimate users, but does not transmit during that allocated time.

The measurements reported by the physical layer or the information available at the MAC layer may be stored in a database. The database is constructed in a way that allows fast queries and inputs of new information, along with an interface to a software daemon that runs a suite of detection algorithms looking for suspect behaviors using information contained in the database. Operation of the detection of MAC layer misbehavior may be event triggered. Whenever a MAC layer event occurs, the database is written to, read from, or inferred from.

In order to implement the physical layer security, certain messages need to be exchanged between two communicating entities. Messaging required for the physical layer security operations is explained hereafter.

In order to generate a key using the physical layer security, a "syndrome" message needs to be exchanged between the communicating entities. For example, one entity generates a syndrome from a key which is derived from a joint randomness shared by the two communicating entities and sends the syndrome to the communication peer over the wireless medium. For example, the syndrome may be generated by performing convolutional coding on the channel impulse response obtained from the channel estimation. The other entity then generates the same key from the received syndrome and the joint randomness, (e.g., the channel estimate). The nature of the information carried in this message depends on the specific algorithm used. In accordance with one embodiment, a new message is defined for transporting physical layer key generation syndrome.

Timing synchronization messages may also be defined. Correlated channel information gathered by the two communicating entities involved in a key extraction protocol needs to be sanitized and paired using a common time frame. MAC layer management frames may be used to carry information critical for time synchronization and pairing of collected channel information.

Messages for negotiation of physical layer security capabilities may also be defined. 802.11 WTRUs and APs need a means to negotiate the physical layer security capabilities with each other to determine whether or not to use the physical layer security operations. This may be accomplished using management messages with type fields that have been reserved for future use.

Messages for checking successful key generation may also be defined. In a key extraction protocol using physical layer attributes, it is necessary to check whether or not the key extraction resulted in the successful generation of the same key at each communicating entity. For example, this may be accomplished using a two-way challenge response mechanism, wherein one user sends the other user an encrypted random nonce N and expects an encrypted N+1 nonce in return.

A message for re-authentication may also be defined. In physical layer security-based authentication, if the authentication check fails, then a WTRU or AP may need to re-authenticate each other. This may happen, for instance, if a spoofing attack is under way.

In accordance with one embodiment, the AP is allowed to issue commands to selected WTRUs to change their CSMA/CA back-off policy. This may help, for example, in countering the influence of a greedy user or a low power jammer that has been detected by the AP or by other WTRUs. The AP runs a detection algorithm and triggers the CSMA/CA back-off time change command to specific WTRU(s) once a greedy user or a low power jammer is detected. The command must be authenticated, and may optionally be encrypted so that the receiving entity can be sure the command was issued by the AP and not spoofed by another, possibly malicious user. The primitives provided by 802.11w for management frame protection may be utilized for protecting this command.

The WTRU or AP may have multiple antennas. The availability of multiple antennas at the WTRU or AP increases the amount of flexibility available at the physical layer in manipulating the overall transmit signal. Providing the controls for dynamically changing the transmit signal using multiple antenna is crucial to security services. In accordance with one embodiment, beam steering using multiple antennas may be used to determine that the direction from which most interference is originating is non-random and instead persistently arrives from a single direction. This helps distinguish a malicious interferer targeting the system from greater ambient interference. Further, if the presence of a malicious jammer radiating from a certain direction has been detected, the receive beam pattern may be steered to create a spectral null in the direction of the suspected jammer. Providing fine grained control over beam steering at a per-packet level will allow tight control for dealing with interference and malicious jammers.

Collaborative sensing may be performed. WTRUs in idle mode may be ordered to participate in the sensing of the channel to monitor activity and report it to the AP in a low rate manner. This allows the capability for detecting malicious users and jammers to be extended from the AP to potentially the entire BSS. The AP may then process the reports received from the WTRUs, along with its own measurements and use them as an input for detecting suspicious or non-compliant MAC/PHY layer behavior.

The MAC address may be correlated with physical layer CIR signatures. The physical layer may report CIR to the MAC layer. Each MAC address from which a message is received is associated to a CIR signature profile in a channel signature database. The MAC layer tracks each MAC address in a channel signature database, and if multiple MAC addresses seem to be generating identical CIR signature, this raises a flag as to the possibility of a Sybil attack.

Examples of the physical layer security operations are explained hereafter. It should be noted that the embodiments disclosed above are applicable to any scenario and shall not be construed to be limited to the examples disclosed below.

In an exemplary low-power jammer attack, the attacking terminal reverses the CSMA/CA process and transmits whenever it detects energy on the channel. Legitimate terminals which operate according to the proper CSMA protocol are therefore forced into an increasing back-off operation, eventually attempting to transmit less and less Thus, the energy required to maintain the attack quickly becomes very low because after a fairly short period, most terminals are in a long back-off state. In a sense, the CSMA protocol is assisting the attack.

Figure 3:
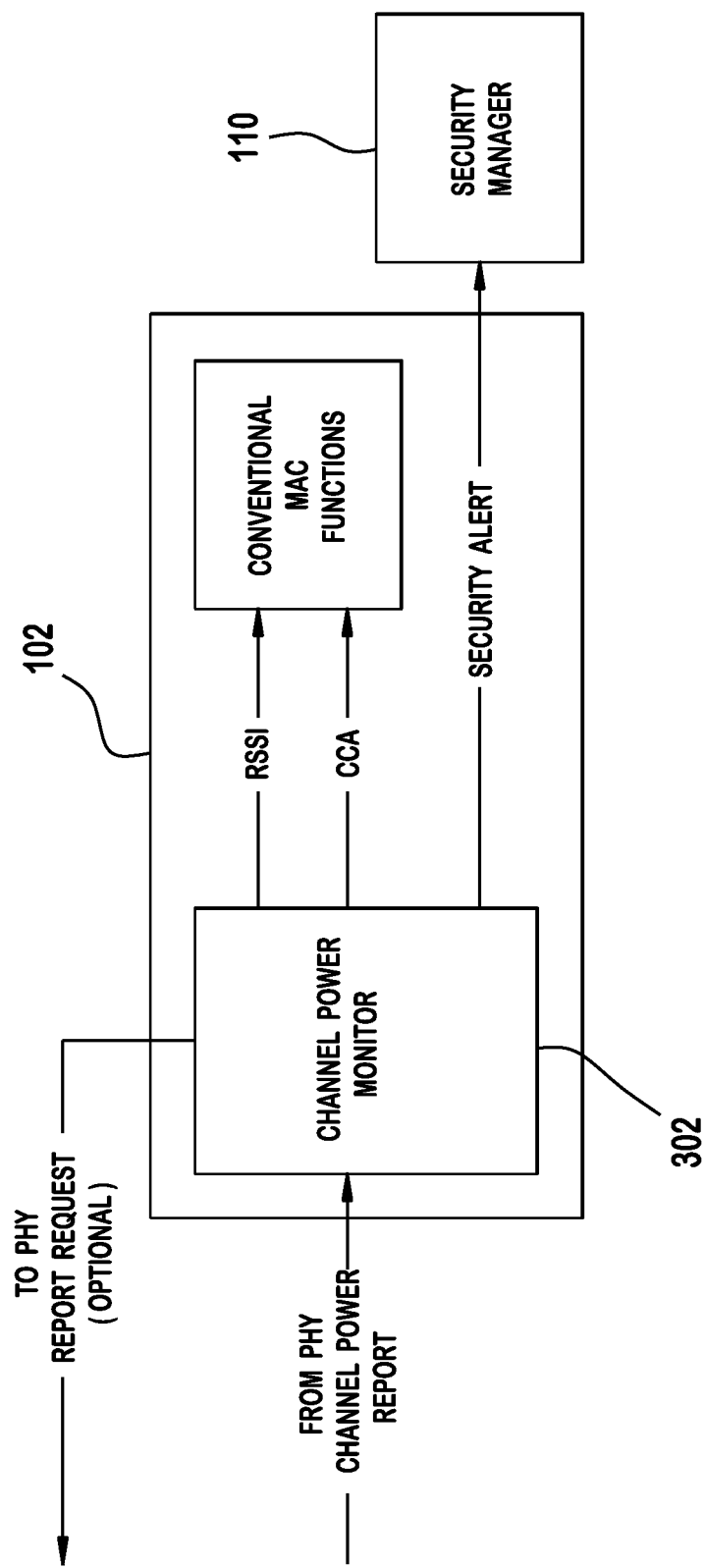
FIG. 3 shows an MAC layer and the security manager in accordance with one embodiment.

To understand how this attack may be combated, consider FIG. 3 which shows a MAC layer 102 and the security manager 110 in accordance with one embodiment. The MAC layer 102 includes a channel power monitor 302. The channel power monitor 302 is configured to receive a channel power report (e.g., RSSI and CCA signal) from the physical layer (i.e., channel power report entity) and performs statistical processing. Optionally, the channel power monitor 302 may send a request for the report to the channel power report entity in the physical layer. The channel power monitor 302 statistically processes the RSSI and CCA signal and sends a security alert to the security manager 110 upon detection of an abnormal condition based on the RSSI and CCA signals.

A low-power jammer attack may be detected based on the power measurement report from the channel power report entity. The power measurement during channel clear state and burst reception may reveal that a burst should be successfully received. When this is violated sufficiently often, (i.e., when a statistically "impossible" collision pattern occurs), a low-power jammer attack is likely.

If the terminal (WTRU or AP) is multiple-input multiple-output (MIMO) capable, the direction of interference may be estimated and if the direction of the interference is not random, a security alert may be triggered to the security manager.

Figure 4:
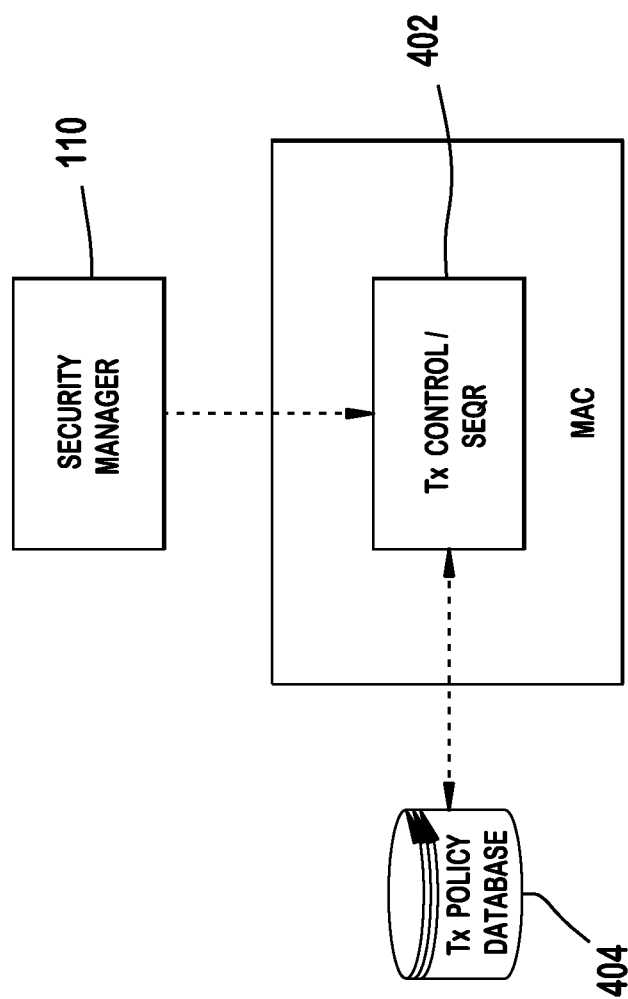
FIG. 4 shows communication between the security manager and the MAC layer after detecting the potential attack.

FIG. 4 shows communication between the security manager 110 and the MAC layer 102 after detecting the potential attack. Upon receiving a security alert from the channel power monitor 302 indicating a potential low-power jammer attack, the security manager 110 sends a signal to a transmission control/sequencer 402 in the MAC layer 102. The transmission control/sequencer 402 is in communication with a transmission policy database 404. Conventionally, only one transmission policy, (i.e., current CSMA/CA back-off policy), is implemented. In accordance with one embodiment, a plurality of transmission policies may be configured and stored in the database 404, and the transmission control/sequencer 402 may select a different transmission policy based on the request from the security manager 110 when the low-power jammer attack is likely. For example, the transmission control/sequencer 402 may reduce the back-off timer once a collision occurs, instead of increasing it, which will make the attack costly in terms of energy and may drain the battery of a true low-power attacker. Alternatively, after receiving the alert, the security manager 110 may request to switch a channel. The security manager 110 may implement a dynamic channel hopping policy. If the terminal is MIMO-capable, the security manager 110 may adjust the beam steering to null the interference source away.

In another exemplary attack, called a Sybil attack, the attacking terminal uses multiple MAC addresses to increase its share of bandwidth utilization and attempt a service specific denial of service (DoS). For example, the service specific DoS may be multiple authentication/association requests.

The Sybil attack may be detected using channel-based signatures where multiple MAC addresses appear to be from the same radio.

As stated above, the physical layer may report a CIR to the MAC layer. The reported CIR is stored in a channel signature database. The MAC layer is configured to perform address matching to check for CIR-source MAC address consistency. Each time the MAC layer receives a PDU from the physical layer, the MAC layer checks the consistency of the CIR associated with the PDU and the source MAC address of the PDU. Once the MAC layer notices the inconsistency of the CIR-source MAC address matching, the MAC layer sends an alert to the security manager.

The security manager may instruct the MAC layer to de-associate the terminal, or change a channel, etc. Alternatively, if the terminal has multiple antennas, the security manager may instruct the physical layer to change a beamforming vector to null out the attacker.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) device comprising:
   a processor;
   a computer-readable storage medium comprising computer executable instructions which, when executed by the processor, implement at least one of a physical layer, a medium access control (MAC) layer, and a security manager;
   the physical layer configured to receive a burst, perform measurements continuously, and report the measurements to the MAC layer to enable physical layer security;
   the MAC layer configured to process the measurements received from the physical layer, detect a potential attack based on the measurements, and send a security alert to the security manager upon detection of the potential attack; and
   the security manager configured to implement a counter-measure to the potential attack upon receipt of the security alert from the MAC layer to establish the physical layer security,
   wherein the measurement includes a channel impulse response (CIR), and the WTRU device further comprising: a database configured to associate a source MAC address of a received packet and the CIR measured on the burst carrying the packet, wherein the MAC layer is configured to check consistency of the source MAC address-CIR pair and detect the potential attack on a condition that the source MAC address-CIR pair is not consistent.

2. The WTRU device of claim 1 wherein the measurements further include at least one of physical medium power measurement, automatic gain control (AGC) value and status, automatic frequency control (AFC) gain and status, analog-to-digital converter (ADC) gain, Doppler spread estimate, or short preamble matched filter output.

3. The WTRU device of claim 2 wherein the physical layer is configured to report the physical medium power measurement to the MAC layer at a rate configured by a higher layer.

4. The WTRU device of claim 3 wherein the MAC layer is configured to perform statistical processing on the physical medium power measurement and detect a low-power jammer attack on a condition that it is determined based on the physical medium power measurement that an unlike collision occurs repeatedly.

5. The WTRU device of claim 1 wherein the security manager is configured to switch a channel upon reception of the security alert.

6. The WTRU device of claim 1 wherein the security manager is configured to switch a channel hopping policy upon reception of the security alert to establish the physical layer security.

7. The WTRU device of claim 1 wherein the security manager is configured to change a back-off protocol upon reception of the security alert to establish the physical layer security.

8. The WTRU device of claim 1 wherein the security manager is configured to change a beamforming vector upon reception of the security alert to establish the physical layer security.

9. A method comprising:
   a physical layer performing physical layer measurements continuously;
   the physical layer reporting the measurements to a medium access control (MAC) layer to enable physical layer security;
   the MAC layer processing the measurements;
   the MAC layer sending a security alert to a security manager upon detection of a potential attack based on the measurements; and
   the security manager implementing a counter-measure to the potential attack upon receipt of the security alert from the MAC layer to establish the physical layer security, wherein the measurement includes a channel impulse response (CIR), and the method further comprising: storing the CIR in a database, the CIR being associated with a source MAC address of a received packet; and checking consistency of a source MAC address-CIR pair, wherein the potential attack is detected on a condition that the source MAC address-CIR pair is not consistent.

10. The method of claim 9 wherein the measurements further include at least one of physical medium power measurement, automatic gain control (AGC) value and status, automatic frequency control (AFC) gain and status, analog-to-digital converter (ADC) gain, Doppler spread estimate, or short preamble matched filter output.

11. The method of claim 10 wherein the physical layer reports the physical medium power measurement at a rate configured by a higher layer.

12. The method of claim 11 wherein the MAC layer performs statistical processing on the physical medium power measurement and detects a low-power jammer attack on a condition that it is determined based on the physical medium power measurement that an unlike collision occurs repeatedly.

13. The method of claim 9 further comprising: switching a channel upon reception of the security alert to establish the physical layer security.

14. The method of claim 9 further comprising: switching a channel hopping policy upon reception of the security alert to establish the physical layer security.

15. The method of claim 9 further comprising: changing a back-off protocol upon reception of the security alert to establish the physical layer security.

16. The method of claim 9 further comprising: changing a beamforming vector upon reception of the security alert to establish the physical layer security.

17. A wireless transmit/receive unit (WTRU) device comprising:
a processor;
a computer-readable storage medium comprising computer executable instructions which, when executed by the processor, implement at least one of a physical layer, a medium access control (MAC) layer, and a security manager;
the physical layer configured to receive a burst, perform measurements continuously, and report the measurements to the layer to enable physical layer security;
the MAC layer configured to process the measurements received from the physical layer, detect a potential attack based on the measurements, and produce a security-related quantity; and
the security manager configured to use the security-related quantity or provide the security-related quantity to another entity to implement a counter-measure to the potential attack and establish the physical layer security,
wherein the measurement includes a channel impulse response (CIR), and the WTRU device further comprising: a database configured to associate a source MAC address of a received packet and the CIR measured on the burst carrying the packet, wherein the MAC layer is configured to check consistency of the source MAC address-CIR pair and detect the potential attack on a condition that the source MAC address-CIR pair is not consistent.

18. The WTRU device of claim 17 wherein the MAC layer is configured to communicate with a MAC entity of at least one other entity.

19. The WTRU device of claim 17 wherein the measurements include at least one of physical medium power measurement, automatic gain control (AGC) value and status, automatic frequency control (AFC) gain and status, analog-to-digital converter (ADC) gain, Doppler spread estimate, or short preamble matched filter output.

20. The WTRU device of claim 17 wherein the security-related quantity is a source signature or a pairwise security key.

21. A method comprising:
a physical layer performing physical layer measurements continuously;
the physical layer reporting the measurements to a medium access control (MAC) layer to enable physical layer security;
the MAC layer processing the measurements received from the physical layer;
the MAC layer detecting a potential attack based on the measurements and producing a security-related quantity; and
a security manager using the security-related quantity or providing the security-related quantity to another entity to implement a counter-measure to the potential attack and establish the physical layer security,
wherein the measurement includes a channel impulse response (CIR), and the WTRU device further comprising: a database configured to associate a source MAC address of a received packet and the CIR measured on the burst carrying the packet, wherein the MAC layer is configured to check consistency of the source MAC address-CIR pair and detect the potential attack on a condition that the source MAC address-CIR pair is not consistent.

22. The method of claim 21 further comprising the MAC layer communicating with a MAC entity of at least one other entity.

23. The method of claim 21 wherein the measurements further include at least one of physical medium power measurement, automatic gain control (AGC) value and status, automatic frequency control (AFC) gain and status, analog-to-digital converter (ADC) gain, Doppler spread estimate, or short preamble matched filter output.

24. The method of claim 21 wherein the security-related quantity is a source signature or a pairwise security key.

* * * * *